United States Patent Office 3,445,468
Patented May 20, 1969

3,445,468
SPIRO THIOPHOSPHATES
Rudi F. W. Rätz, Hamden, and Arthur D. Bliss, Guilford, Conn., assignors to Olin Mathieson Chemical Corporation, New Haven, Conn., a corporation of Virginia
No Drawing. Filed Oct. 13, 1964, Ser. No. 403,651
Int. Cl. C07d 105/04; A01n 9/36
U.S. Cl. 260—256.5                                      10 Claims

ABSTRACT OF THE DISCLOSURE

A series of valuable spiro thiophosphates has been provided by the reaction of 3,9-dichloro-2,4,8,10-tetraoxa-3,9-diphosphaspiro[5.5]undecane - 3,9 - disulfide with the alkali metal salts of a number of aromatic and heterocyclic hydroxy compounds. These thiophosphates have been found to be valuable pesticides, particularly as nematocides.

---

This invention relates to spiro thiophosphates having the general formula:

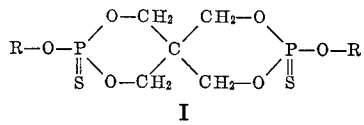

I wherein R represents halogenated phenyl, nitrated phenyl, nitrated tolyl, nitrated halophenyl, alkylmercaptophenyl and selected heterocyclic moieties.

Sulfur-free pentaerythritol bis-phosphates have been previously prepared by the reaction of the penetaerythritol ester of phosphorochloridic acid with various phenols and alcohols as disclosed in U.S. Patent 3,090,799. Aliphatic and cycloaliphatic pentaerythritol bis-dithiophosphates were obtained according to a process disclosed in U.S. Patent 3,129,074 wherein the reaction product of pentaerythritol and phosphorus pentasulfide is added across the double bond of an appropriate olefinic compound. However, all previous attempts to prepare spiro thiophosphates of the type illustrated by the Formula I have been heretofore unsuccessful.

It has now been found that a series of spiro thiophosphates having the general Formula I can be conveniently prepared by the reaction of 3,9-dichloro-2,4,8,10-tetraoxa-3,9-diphosphaspiro[5.5]undecane-3,9 - disulfide with the alkali metal salts of a number of aromatic and heterocyclic hydroxy compounds. These thiophosphates have been found to be valuable pesticides, particularly as nematocides. An efficient process for the preparation of these derivatives in high yield and purity has been provided.

The aforementioned bis-thionophosphorochloridate hereinafter referred to as the "disulfide," prepared by the reaction of pentaerythritol bis-hydrogen thiophosphite with carbon tetrachloride as disclosed in copending U.S. application S.N. 361,263, filed on April 20, 1964, now U.S. Patent No. 3,325,566, has the following structural formula:

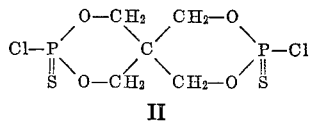

II

Thus included among the salts of aromatic hydroxy compounds which may be reacted with the disulfide (II) to provide spiro thiophosphates represented by the Formula I are the alkali metal salts of the following halogenated phenols: o-bromophenol, m-bromophenol, p-bromophenol, o-iodophenol, m-iodophenol, p-iodophenol, m-chlorophenol, p-chlorophenol, o-chlorophenol, o-fluorophenol, m-fluorophenol, p-fluorophenol, 2,3 - dichlorophenol, 2,4-dichlorophenol, 2,5 - dichlorophenol, 2,6 - dichlorophenol, 3,4-dichlorophenol, 3,5-dichlorophenol, 2, 4,5-trichlorophenol, 2,4,6-trichlorophenol, 3,4,5-trichlorophenol, 2,3,4-trichlorophenol, 2,3,5-trichlorophenol, 2,3, 6 - trichlorophenol, 2,3,5,6 - tetrachlorophenol, 2,3,4,5,6-pentachlorophenol, 2,3,4,5-tetrachlorophenol, and 2,3,4, 6-tetrachlorophenol.

Similarly, the alkali metal salts of 2,4-dibromophenol, 2,3-dibromophenol, 2,5-dibromophenol, 2,6-dibromophenol, 2,3,4 - tribromophenol, 3,5 - dibromophenol, 3,4 - dibromophenol, 2,3,4,5 - tetrabromophenol, 2,3,4,6 - tetrabromophenol, 2,3,4,5,6-pentabromophenol, 2,3,5-tribromophenol, 2,4,5-tribromophenol, 2,4,6-tribromophenol, 2,4-diiodophenol, 2,5-diiodophenol, 2,6-diiodophenol, 3, 4-diiodophenol, 3,5-diiodophenol, 2,3,5-triiodophenol, 2, 4,6-triiodophenol, 2,6-dichloro-4-fluorophenol, 2 - bromo-4-fluorophenol, 2-chloro - 4 - fluorophenol, 2,4-dichloro-5-fluorophenol, 2,3,4,6-tetrachloro - 5 - fluorophenol, 2,3,6-trichloro-3,5-difluorophenol, 2,6-dichloro-3,4,5 - trifluorophenol and pentafluorophenol are also particularly suitable for reaction with the disulfide to provide spiro thiophosphates.

Spiro thiophosphates of the Formula I wherein R represents nitrated phenyl or nitrated tolyl are also provided in accordance with this invention. Included among the reactants which can be reacted with the disulfide (II) to provide spiro thiophosphates are the alkali metal salts of o-nitrophenol, m-nitrophenol, p-nitrophenol, 2,4-dinitrophenol, 2,6-dinitrophenol, 3,4-dinitrophenol, 4-hydroxy-2-nitrotoluene, 2-hydroxy-4-nitrotoluene, 2 - hydroxy-3, 5-dinitrotoluene, 3-hydroxy-6-nitrotoluene, 2,3 - dinitrophenol, 2,5-dinitrophenol, 2,4,6-trinitrophenol, 2,3,6-trinitrophenol, 2,4,5-trinitrophenol, 2,3,4,6 - tetranitrophenol, pentanitrophenol, 2-hydroxy-3-nitrotoluene, 2-hydroxy-5-nitrotoluene, 3-hydroxy-2-nitrotoluene, 3-hydroxy-4-nitrotoluene, and 3-hydroxy-2,4,6-trinitrotoluene.

Other salts which are conveniently reacted with the disulfide to provide spiro thiophosphates include the salts of 2-chloro-4-nitrophenol, 2-chloro-6-nitrophenol, 3-chloro-4-nitrophenol, 4-chloro-2-nitrophenol, 2,6 - dichloro-4-nitrophenol, 2,6-dibromo-4-nitrophenol, 4,6 - dibromo-2-nitrophenol and the salts of alkylmercaptophenols such as 4-methylmercaptophenol and 4-butylmercaptophenol. As used in the specification and claims herein, the term "alkyl" represents a moiety having 1–4 carbon atoms.

Spiro thiophosphates having the Formula I wherein R is a pyrimidine or substituted pyrimidine group are also provided in accordance with this invention. For example, among the compounds which can be reacted with the disulfide (II) to provide these compounds are the alkali metal salts of:

2-pyrimidinol,
5-bromopyrimidinol-2,
5-chloropyrimidinol-2,
4,5-dichloropyrimidinol-2,
4,5-dimethylpyrimidinol-2,
4,6-dimethylpyrimidinol-2,
4-methylpyrimidinol-2,
4-methoxy-6-methylpyrimidinol-2,
5-nitropyrimidinol-2,
4-pyrimidinol,
5-bromopyrimidinol-4,
5-chloropyrimidinol-4,
6-chloro-2,5-dimethylpyrimidinol-4,
6-chloro-2-methylpyrimidinol-4,
2,6-diethylpyrimidinol-4,
2,5-diethyl-6-methylpyrimidinol-4,
2,5-dimethylpyrimidinol-4, 2,6-dimethylpyrimidinol-4,
2,6-dimethyl-5-nitropyrimidinol-4,
2-ethoxypyrimidinol-4,
2-ethoxy-6-methylpyrimidinol-4,
6-ethoxy-2-methylpyrimidinol-4,
2-ethyl-5,6-dimethylpyrimidinol-4,
5-ethyl-2,6-dimethylpyrimidinol-4,
6-ethyl-2,5-dimethylpyrimidinol-4,
2-ethyl-6-methylpyrimidinol-4,
6-ethyl-5-methylpyrimidinol-4,
2-isopropyl-6-methylpyrimidinol-4,
6-isopropyl-2-methylpyrimidinol-4,
5-methoxypyrimidinol-4,
2-methoxy-6-methylpyrimidinol-4,
6-methyl-2-propylpyrimidinol-4,
6-methyl-5-propylpyrimidinol-4, and
5-pyrimidinol.

Preferred embodiments of this invention include the spiro thiophosphates (I) wherein R represents a pyrimidine or alkylpyrimidine group.

Other heterocyclic substituted spiro thiophosphates are also readily produced in accordance with this invention. Thus for example derivatives of the Formula I wherein R is a pyridine or substituted pyridine group can be provided. Included among the salt reactants which will provide such derivatives are the alkali metal salts of:

2-pyridinol,
3-bromo-4,6-dimethyl-5-nitro-2-pyridinol,
3-bromo-6-methyl-5-nitro-2-pyridinol,
5-bromo-6-methyl-3-nitro-2-pyridinol,
3-bromo-5-nitro-2-pyridinol,
5-bromo-3-nitrol-2-pyridinol,
4-chloro-6-methyl-3-nitro-2-pyridinol,
3-chloro-5-nitro-2-pyridinol,
4-chloro-3-nitro-2-pyridinol,
5-chloro-3-nitro-2-pyridinol,
6-chloro-5-nitro-2-pyridinol,
4,6-dimethyl-5-nitro-2-pyridinol,
3,5-dinitro-2-pyridinol,
3-methyl-5-nitro-2-pyridinol,
4-methyl-5-nitro-2-pyridinol,
4-methyl-3-nitro-2-pyridinol,
6-methyl-3-nitro-2-pyridinol,
5-methyl-3-nitro-2-pyridinol,
6-methyl-5-nitro-2-pyridinol,
3-nitro-2-pyridinol,
5-nitro-2-pyridinol,
3-pyridinol,
2-nitro-3-pyridinol,
4-pyridinol,
3,5-dinitro-4-pyridinol,
2-methyl-3,5-dinitro-4-pyridinol,
2-methyl-3-nitro-4-pyridinol,
2-methyl-5-nitro-4-pyridinol,
3-methyl-5-nitro-4-pyridinol, and
3-nitro-4-pyridinol.

Similarly, benzopyran and substituted benzopyran bisthiophosphates can be provided in accordance with this invention. These compounds are prepared by the reaction of appropriate hydroxycoumarins with the disulfide (II). Among the substituted coumarins which may be utilized in the practice of this invention are:

7-hydroxycoumarin,
3-bromo-7-hydroxycoumarin,
6-bromo-7-hydroxycoumarin,
6-bromo-3-ethyl-4-methyl-7-hydroxycoumarin,
3-bromo-4-methyl-7-hydroxycoumarin,
6-bromo-4-methyl-7-hydroxycoumarin,
4-butyl-7-hydroxycoumarin,
6-butyl-7-hydroxycoumarin,
6-chloro-7-hydroxycoumarin,
6-chloro-4-methyl-7-hydroxycoumarin,
3-chloro-4-methyl-7-hydroxycoumarin,
8-chloro-4-methyl-7-hydroxycoumarin,
4,5-dimethyl-7-hydroxycoumarin,
4,8-dimethyl-7-hydroxycoumarin,
5,8-dimethyl-7-hydroxycoumarin,
3-ethyl-7-hydroxycoumarin,
6-ethyl-7-hydroxycoumarin,
6-ethyl-3,4-dimethyl-7-hydroxycoumarin,
3-ethyl-4-methyl-7-hydroxycoumarin,
5-ethyl-4-methyl-7-hydroxycoumarin,
6-ethyl-4-methyl-7-hydroxycoumarin,
5-methoxy-7-hydroxycoumarin,
6-methoxy-7-hydroxycoumarin,
8-methoxy-7-hydroxycoumarin,
5-methoxy-4-methyl-7-hydroxycoumarin,
5-methoxy-6-methyl-7-hydroxycoumarin,
3-methyl-7-hydroxycoumarin,
6-methyl-7-hydroxycoumarin,
4-methyl-6-nitro-7-hydroxycoumarin,
4-methyl-8-nitro-7-hydroxycoumarin,
4-methyl-3-propyl-7-hydroxycoumarin, and
4-methyl-6-propyl-7-hydroxycoumarin.

The spiro thiophosphates of this invention are conveniently prepared by the reaction of the disulfide (II) with the aforementioned salts at a reaction temperature range of about 0°–80° C. Preferably stoichiometric quantities of the reactants are employed at about room temperature. Although any of the alkali metal salts may be utilized, the sodium and potassium salts are preferably used. It has been found that solvents are advantageously employed in the practice of this invention. Particularly polar solvents such as the dialkyl amides of the lower aliphatic acids, e.g., dimethylformamide and dimethylacetamide are suitable. Other solvents which may be utilized in the preparation of the spiro thiophosphates are dioxane and an acetone-water mixture. Upon completion of the reaction, the product is conveniently obtained by pouring the reaction mixture into water and filtering the desired product from the aqueous medium.

The spiro thiophosphates of this invention are useful as contact insecticides. Moreover, they are particularly effective and valuable nematocides. They are effective in controlling the root-knot nematode Meloidgyne incognita on tomato and cucumber plants when applied to the soil surrounding these plants. For example, 3,9-bis(2,6-dibromo-4 - nitrophenoxy)2,4,8,10 - tetraoxa - 3,9 - diphosphaspiro[5.5]undecane - 3,9 - disulfide; 3,9-bis(2 - chloro - 4 - nitrophenoxy)2,4,8,10-tetraoxa - 3,9 - diphosphaspiro[5.5] undecane - 3,9 - disulfide; and 3,9-bis(2 - isopropyl-4-methyl - pyrimidyl - 6 - oxy)2,4,8,10-tetraoxa-3,9-diphosphaspiro[5.5]undecane-3,9-disulfide nearly completely inhibit the growth of root-knots on these plants even in soil heavily infested with the aforementioned nematodes.

The following examples will serve to illustrate the preparation of several of the spiro thiophosphates of this invention.

EXAMPLE 1

Potassium 2-chloro-6-nitrophenoxide was prepared by treating a solution of 2-chloro-6-nitrophenol in ethanol with the stoichiometric amount of alcoholic potassium hydroxide. To a stirred suspension of 6.5 g. (0.03 mole) of the salt in 50 ml. of anhydrous N,N-dimethylacetamide was added in one portion a solution of 5.0 g. (0.015 mole) of 3,9-dichloro - 2,4,8,10 - tetraoxa - 3,9 - diphosphaspiro [5.5]undecane-3,9-disulfide in 35 ml. of N,N-dimethylacetamide. The phenoxide dissolved and a fine white solid slowly formed in the reaction mixture. The reaction mixture was allowed to stand at room temperature for 4 hours, and then stood overnight at 60° C. The mixture was cooled and filtered to obtain a solid which was washed once with 15 ml. of dimethylacetamide. The solid was then washed several times with ether and upon drying was identified as potassium chloride in the amount of 1.8 g.

(82%). The dimethylacetamide filtrate was poured into 500 ml. of cold water and a fine yellow solid precipitated from solution. This solid was collected by filtration, washed three times with 100 ml. portions of water, once with a 50 ml. portion of ethanol, and then it was dried overnight in vacuo. The solid thus obtained weighed 8.1 g. and melted at 252°–254° C. with slight decomposition. This product was recrystallized twice from a mixed ethanol-acetone solvent giving 6.0 g. of beautiful greenish-yellow crystals melting at 254°–255° C. with slight decomposition. Infrared and elemental analysis revealed that the desired 3,9-bis(2-chloro-6-nitrophenoxy)2,4,8,10 - tetraoxa - 3,9 - diphosphaspiro[5.5]undecane - 3,9 - disulfide had been obtained. Yield: 89.5%.

Analysis.—Calcd. for $C_{17}H_{14}Cl_2N_2O_{10}P_2S_2$: C, 33.84; H, 2.34; Cl, 11.8; N, 4.64; P, 10.27. Found: C, 33.84; H, 2.28; Cl, 11.8; N, 4.93; P, 10.25.

EXAMPLE 2

To a stirred solution of 8.6 g. (0.03 mole) of sodium pentachlorophenoxide in 50 ml. of anhydrous N,N-dimethylacetamide was added in one portion a solution of 5.0 g. (0.015 mole) of 3,9-dichloro-2,4,8,10-tetraoxa-3,9-diphosphaspiro[5.5]undecane - 3,9 - disulfide in 35 ml. of N,N-dimethylacetamide. A large amount of fine, white solid began to precipitate after a few minutes. The mixture was allowed to stand at room temperature for six hours. The solid was removed by filtration and washed with 20 ml. of dimethylacetamide. The addition of water to the filtrate gave no precipitate. The solid was washed five times with 100 ml. portions of water and twice with 100 ml. portions of ethanol. After drying overnight in vacuo over phosphorus pentoxide, the solid weighed 10.6 g. and did not melt or decompose at temperatures up to 325° C. No satisfactory solvent for recrystallization could be found, but infrared and elemental analysis revealed that 3,9 - bis(pentachlorophenoxy)2,4,8,10 - tetraoxa-3,9-diphosphaspiro[5.5]undecane-3,9-disulfide had been obtained. Yield 98%.

Analysis.—Calcd. for $C_{17}H_8Cl_{10}O_6P_2S_2$: C, 25.88; H, 1.02; Cl, 44.9; P, 7.85. Found: C, 26.24; H, 1.24; Cl, 44.7; P, 7.75.

EXAMPLE 3

Using the procedure of Example 1, 5.4 g. (0.03 mole) of the potassium salt of 2-hydroxy-5-nitropyridine was reacted with 5.0 g. (0.015 mole) of 3,9-dichloro-2,4,8,10-tetraoxa - 3,9 - diphosphaspiro[5.5]undecane - 3,9 - disulfide. A solid product melting at 226°–227° C. with decomposition was obtained after recrystallization from a mixed ethanolacetone solution. The following analytical data revealed that 3,9-bis(5-nitro-2-pyridyloxy)2,4,8,10-tetraoxa - 3,9 - diphosphaspiro[5.5]undecane - 3,9 - disulfide had been obtained. Yield: 45%.

Analysis.—Calcd. for $C_{15}H_{14}N_4O_{10}P_2S_2$: C, 33.58; H, 2.63; N, 10.45; P, 11.55. Found: C, 33.54; H, 2.60; N, 10.41; P, 11.47.

EXAMPLE 4

3,9-bis(4 - methylmercaptophenoxy)2,4,8,10 - tetraoxa-3,9 - diphosphaspiro[5.5]undecane - 3,9 - disulfide was obtained in 45% yield when 5.3 g. (0.033 mole) of sodium 4-methylmercaptophenoxide and 5.0 g. (0.015 mole of 3,9-dichloro - 2,4,8,10 - tetraoxa - 3,9 - diphosphaspiro[5.5]undecane-3,9-disulfide were reacted using the technique of Example 1. The product melted at 207°–208° C. after recrystalliaztion from a mixed ethanol-acetone solvent.

Analysis.—Calcd. for $C_{19}H_{22}O_6P_2S_4$: C, 42.53; H, 4.13; P, 11.54; S, 23.91. Found: C, 42.52; H, 4.10; P, 11.46; S, 23.63.

EXAMPLE 5

3,9 - bis(2,4,5 - trichlorophenoxy)2,4,8,10 - tetraoxa-3,9 - diphosphaspiro[5.5]undecane - 3,9 - disulfide was obtained in 53% yield when 6.6 g. (0.033 mole) of sodium 2,4,5-trichlorophenoxide and 5.0 g. (0.015 mole) of 3,9-dichloro-2,4,8,10 - tetraoxa - 3,9 - diphosphaspiro[5.5]undecane-3,9-disulfide was reatced as in Example 1. The solid product melted at 242°–243° C. after two recrystallizations from toluene.

Analysis.—Calcd. for $C_{17}H_{12}Cl_6O_6P_2S_2$: C, 31.36; H, 1.86; Cl, 32.7; P, 9.51. Found: C, 31.82; H, 1.84; Cl, 32.0; P, 9.53.

EXAMPLE 6

Using the procedure of Example 1, 5.1 g. of sodium 2-chloro-4-fluorophenoxide was reacted with 5.0 g. of 3,9 - dichloro - 2,4,8,10 - tetraoxa - 3,9 - diphosphaspiro [5.5]undecane-3,9-disulfide. A solid product melting at 202°–203° C. was obtained after two recrystallizations from a mixed acetone-ethanol solvent. The following analytical data revealed that 3,9-bis(2-chloro-4-fluorophenoxy)2,4,8,10 - tetraoxa - 3,9 - diphosphaspiro[5.5]undecane-3,9-disulfide had been obtained. Yield: 65%.

Analysis.—Calcd. for $C_{17}H_{14}Cl_2F_2O_6P_2S_2$: C, 37.17; H, 2.57; F, 6.92; P, 11.28. Found: C, 38.12; H, 2.57; F, 6.46; P, 11.25.

EXAMPLE 7

3,9 - bis(2,4 - dichlorophenoxy)2,4,8,10 - tetraoxa-3,9-diphosphaspiro[5.5]undecane - 3,9 - disulfide was obtained in 70% yield when 4.6 g. of sodium 2,4-dichlorophenoxide and 4.2 g. of 3,9-dichloro-2,4,8,10-tetraoxa-3,9-diphosphaspiro[5.5]undecane - 3,9 - disulfide were reacted together using the procedure of Example 1. The product melted at 204°–205° C. after being recrystallized from a mixed acetone-ethanol solvent.

Analysis.—Calcd. for $C_{17}H_{14}Cl_4O_6P_2S_2$: C, 35.06; H, 2.42; Cl, 24.4; P, 10.64. Found: C, 35.23; H, 2.29; Cl, 24.4; P, 10.66.

EXAMPLE 8

Using the technique of Example 1, 6.3 g. of potassium 4-bromophenoxide was reacted with 5.0 g. of 3,9-dichloro-2,4,8,10-tetraoxa - 3,9 - diphosphaspiro[5.5]undecane-3,9-disulfide. A crystalline product was obtained which melted at 217°–218° C. after being recrystallized from a mixed acetone-ethanol solvent. The following analytical data revealed that 3,9-bis(4-bromophenoxy)2,4,8,10-tetraoxa-3,9-diphosphaspiro[5.5]undecane-3,9-disulfide had been obtained. Yield: 60%.

Analysis.—Calcd. for $C_{17}H_{16}Br_2O_6P_2S_2$: C, 33.90; H, 2.68; Br, 26.5; P, 10.29. Found: C, 33.90; H, 2.57; Br, 26.6; P, 10.10.

EXAMPLE 9

3,9 - bis(2,6 - dibromo - 4 -nitrophenoxy)2,4,8,10-tetraoxa-3,9-diphosphaspiro[5.5]undecane-3,9-disulfide was prepared in 70% yield when 10.0 g. of potassium 2,6-dibromo-4-nitrophenoxide was reacted with 5.0 g. of 3,9 dichloro - 2,4,8,10 - tetraoxa - 3,9 - diphosphaspiro[5.5] undecane - 3,9 - disulfide at room temperature. The solid product was recrystallized from a mixed ethanol-N,N dimethylacetamide solvent, and this product decomposed without melting at temperatures above 320° C.

Analysis.—Calcd. for $C_{17}H_{12}Br_4N_2O_{10}P_2S_2$: C, 24.02; H, 1.42; Br, 37.6; P, 7.29. Found: C, 24.32; H, 1.70; Br. 37.2; P, 7.14.

EXAMPLE 10

3,9 - bis(2,6 - dichloro - 4 - nitrophenoxy)2,4,8,10 - tetraoxa - 3,9 - diphosphaspiro[5.5]undecane - 3,9 - disulfide was prepared in 90% yield when 4.9 g. of potassium 2,6-dichloro-4-nitrophenoxide was reacted with 3.3 g. of 3,9-dichloro-2,4,8,10-tetraoxa - 3,9 - diphosphaspiro[5.5] undecane-3,9-disulphide at room temperature. The solid product was recrystallized from nitrobenzene, and the crystalline material decomposed without melting at temperatures above 325° C.

Analysis.—Calcd. for $C_{17}H_{12}Cl_4N_2O_{10}P_2S_2$: C, 30.37; H, 1.80; Cl, 21.1; P, 9.22. Found: C, 31.24; H, 1.93; Cl, 20.6; P, 9.10.

EXAMPLE 11

3,9 - bis(4 - chloro - 2 - nitrophenoxy)2,4,8,10 - tetraoxa - 3,9 - diphosphaspiro[5.5]undecane - 3,9 - disulfide was prepared in 75% yield when 6.5 g. of potassium 4-chloro-2-nitrophenoxide was reacted with 5.0 g. of 3,9-dichloro-2,4,8,10-tetraoxa - 3,9 - diphosphaspiro[5.5]undecane-3,9-disulfide in a similar manner as in Example 1. The solid product melted at 203°–205° C. after it was recrystallized from a mixed acetone-ethanol solvent.

*Analysis.*—Calcd. for $C_{17}H_{14}Cl_2N_2O_{10}P_2S_2$: C, 33.84; H, 2.34; Cl, 11.8; N, 4.64; P, 10.27. Found: C, 34.16; H, 2.30; Cl, 11.9; N, 4.79; P, 10.27.

EXAMPLE 12

Using the procedure shown in Example 1, 6.5 g. of potassium 2-chloro-4-nitrophenoxide was reacted with 5.0 g. of 3,9-dichloro-2,4,8,10-tetraoxa-3,9-diphosphaspiro[5.5]undecane-3,9-disulfide. A crystalline product was obtained which melted at 238°–239° C. after being recrystallized from a mixed acetone-ethanol solvent. The following analytical data revealed that 3,9-bis(2-chloro-4-nitrophenoxy)2,4,8,10 - tetraoxa - 3,9 - diphosphaspiro [5.5]undecane - 3,9 - disulfide had been obtained. Yield: 80%.

*Analysis.*—Calcd. for $C_{17}H_{14}Cl_2N_2O_{10}P_2S_2$: C, 33.84; H, 2.34; Cl, 11.8; N, 4.64; P, 10.27. Found: C, 33.89; H, 2.33; Cl, 12.1; N, 4.81; P, 10.07.

EXAMPLE 13

Similarly, 6.5 g. of potassium 3-chloro-4-nitrophenoxide was reacted with 5.0 g. of 3,9-dichloro-2,4,8,10-tetraoxa - 3,9 - diphosphaspiro[5.5]undecane - 3,9 - disulfide. The resulting solid product melted at 198°–199° C. after it was recrystallized from a mixed acetone-ethanol solvent. The following analytical data revealed that 3,9-bis(3 - chloro - 4 - nitrophenoxy)2,4,8,10 - tetraoxa - 3,9 diphosphaspiro[5.5]undecane-3,9-disulfide had been obtained. Yield: 80%.

*Analysis.*—Calcd. for $C_{17}H_{14}Cl_2N_2O_{10}P_2S_2$: C, 33.84; H, 2.34; Cl, 11.8; N, 4.64; P, 10.27. Found: C, 34.01; H, 2.28; Cl, 12.0; N, 4.90; P, 10.09.

EXAMPLE 14

3,9 - bis(4 - nitrophenoxy)2,4,8,10 - tetraoxa - 3,9-diphosphaspiro[5.5]undecane - 3,9 - disulfide was prepared in 65% yield when 6.5 g. of sodium 4-nitrophenoxide was reacted with 6.6 g. of 3,9-dichloro-2,4,8,10-tetraoxa-3,9 diphosphaspiro[5.5]undecane-3,9-disulfide at room temperature. The product was a solid melting at 243°–244° C. after it was recrystallized from a mixed acetone-ethanol solvent.

*Analysis.*—Calcd. for $C_{17}H_{16}N_2O_{10}P_2S_2$: C, 38.20; H, 3.02; N, 5.24; P, 11.59. Found: C, 38.65; H, 3.02; N, 5.43; P, 11.45.

EXAMPLE 15

The method of H. V. Pechmann and C. Duisberg, Chem. Ber., 16, 2122 (1883) was used to prepare 4-methyl - 7 - hydroxycoumarin(4 - methylumbelliferone). This was converted to its potassium salt by treatment with alcoholic potassium hydroxide. The solvent was evaporated at reduced pressure, and the salt dried in vacuo over phosphorus pentoxide.

The procedure of Example 1 was used to prepare 3,9-bis(4 - methyl - 2 - oxo - 2H - 1 - benzopyran - 7 - yl)-2,4,8,10 - tetraoxa - 3,9 - diphosphaspiro[5.5]undecane-3,9-disulfide from 5.0 g. of 3,9-dichloro-2,4,8,10-tetraoxa-3,9-diphosphaspiro[5.5]undecane - 3,9 - disulfide and 7.0 g. of the potassium salt of 4-methylumbelliferone. The yield of crude product was 8.6 g. (94.5%). After recrystallization from o-dichlorobenzene, the product melted at 260° C. with decomposition.

*Analysis.*—Calcd. for $C_{25}H_{22}O_{10}P_2S_2$: C, 49.34; H, 3.64; P, 10.18; S, 10.54. Found: C, 48.95; H, 3.51; P, 10.09; S, 10.52.

EXAMPLE 16

The method of P. K. Grover, T. R. Seshadri and S. Varadarajan, J. Sci. Ind. Research (India), 11B, 50 (1952); Chem. Abstr., 47, 3303, was used to prepare 3-chloro - 4 - methylumbelliferone from 4-methylumbelliferone. The product melted at 237°–238° C.; reported M.P. 239°–240° C. It was converted to its potassium salt by treatment with alcoholic potassium hydroxide, evaporation of the alcohol at reduced pressure and drying in vacuo over phosphorus pentoxide.

Using the procedure of Example 1, 3,9-bis(3-chloro-4-methyl - 2 - oxo - 2H - 1 - benzopyran - 7 - yl)2,4,8,10-tetraoxa - 3,9 - diphosphaspiro[5.5]undecane - 3,9 - disulfide was prepared in 95% yield from 5.0 g. of 3,9-dichloro-2,4,8,10 - tetraoxa - 3,9 - diphosphaspiro[5.5]undecane-3,9-disulfide and 8.0 g. of the potassium salt of 3-chloro-4-methylumbelliferone. After recrystallization from a mixture of N,N-dimethylformamide and ethanol, the product melted at 308°–309° C. with decomposition.

*Analysis.*—Calcd. for $C_{25}H_{20}Cl_2O_{10}P_2S_2$: C, 44.32; H, 2.98; Cl, 10.5; P, 9.14. Found: C, 44.52; H, 3.09; Cl, 10.7; P, 8.88.

EXAMPLE 17

Methyl isobutyrimidate hydrochloride was prepared from commercial isobutyronitrile and methanol by the method of S. M. McElvain and J. F. Venerable, J. Am. Chem. Soc., 72, 1661 (1950). This was converted into isobutyramidine hydrochloride by a slight modification of the procedure of A. W. Dox, Org. Synth. Coll. Vol. I, 5 (1941). (See also N. S. Drozdov and A. F. Bekhli, J. Gen. Chem. (USSR), 14, 280 (1944); Chem. Abstr., 39, 3785.) The isobutyramidine hydrochloride was condensed with ethyl acetoacetate according to the method of A. Pinner, "Die Iminoäther und ihre Derivate," Oppenheim, Berlin, 1892, to give 6-hydroxy-2-isopropyl-4-methylpyrimidine, M.P. 172°–173° C.; reported M.P. 173° C. The product was converted to its potassium salt by treatment with alcoholic potassium hydroxide, evaporation of the solvent at reduced pressure and drying in vacuo over phosphorus pentoxide.

Using the procedure of Example 1, 3,9-bis(2-isopropyl-4 - methylpyrimidyl - 6 - oxy)2,4,8,10 - tetraoxa - 3,9-diphosphaspiro[5.5]undecane-3,9-disulfide was prepared in 85% yield from 5.0 g. of 3,9-dichloro-2,4,8,10-tetraoxa-3,9-diphosphaspiro[5.5]undecane-3,9-disulfide and 7.4 g. of the potassium salt of 6-hydroxy-2-isopropyl-4-methylpyrimidine. After recrystallization from petroleum ether (65°–110° C.), the product melted at 120°–123° C.

What is claimed is:

1. Spiro thiophosphates having the formula

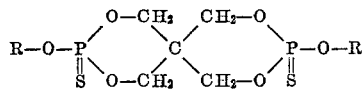

wherein R is selected from the class consisting of alkylmercaptophenyl wherein alkyl represents a moiety having 1–4 carbon atoms, pyrimidine, alkylpyrimidine wherein alkyl represents a moiety having 1–4 carbon atoms, pyridine, nitro pyridine, benzopyran, alkylbenzopyran wherein alkyl represents a moiety having 1–4 carbon atoms, and halogenated benzopyran.

2. The spiro thiophosphates of claim 1 wherein R is alkylmercaptophenyl.

3. The spiro thiophosphates of claim 1 wherein R is alkylbenzopyran.

4. 3,9 - bis(4 - methyl - 2 - oxo - 2H - 1 - benzopyran - 7-yl)2,4,8,10 - tetraoxa - 3,9 - diphosphaspiro[5.5]undecane-3,9-disulfide.

5. The spiro thiophosphates of claim 1 wherein R is halogenated benzopyran.

6. 3,9 - bis(3 - chloro - 4 - methyl - 2 - oxo - 2H - 1- benzopyran - 7 - yl)2,4,8,10 - tetraoxa - 3,9 - diphosphaspiro[5.5]undecane-3,9-disulfide.

7. The spiro thiophosphates of claim 1 wherein R is nitrated pyridine.

8. 3,9 - bis(5 - nitro - 2 - pyridyloxy)2,4,8,10 - tetraoxa-3,9-diphosphaspiro[5.5]undecane-3,9-disulfide.

9. The spiro thiophosphates of claim 1 wherein R is an alkylpyrimidine group.

10. 3,9 - bis(2 - isopropyl - 4 - methyl - pyrimidyl - 6-oxy)2,4,8,10 - tetraoxa - 3,9 - diphosphaspiro[5.5]undecane-3,9-disulfide.

References Cited
UNITED STATES PATENTS

| 3,090,799 | 5/1963 | Wahl et al. | 260—461 |
| 3,129,074 | 4/1964 | Bussert et al. | 44—69 |

ALEX MAZEL, *Primary Examiner.*

R. J. GALLAGHER, *Assistant Examiner.*

U.S. Cl. X.R.

260—294.8, 346.2, 927; 424—200, 205